(12) United States Patent
Lichtenau et al.

(10) Patent No.: US 10,740,098 B2
(45) Date of Patent: Aug. 11, 2020

(54) ALIGNING MOST SIGNIFICANT BITS OF DIFFERENT SIZED ELEMENTS IN COMPARISON RESULT VECTORS

(71) Applicant: INTERNATIONAL BUSINESS MACHINES CORPORATION, Armonk, NY (US)

(72) Inventors: Cedric Lichtenau, Stuttgart (DE); Silvia M. Mueller, Altdorf (DE); Jens P. Seifert, Gaertringen (DE); Jörg-Stephan Vogt, Holzgerlingen (DE); Markus Lachenmayr, Friedberg (DE); L'Emir Salim Chehab, Darmstadt (DE); Pavankrishna Ellore Ramesh, Hannover (DE); Sourabh Chougule, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 94 days.

(21) Appl. No.: 15/889,328

(22) Filed: Feb. 6, 2018

(65) Prior Publication Data

US 2019/0243649 A1 Aug. 8, 2019

(51) Int. Cl.
*G06F 9/30* (2018.01)
(52) U.S. Cl.
CPC ...... *G06F 9/30021* (2013.01); *G06F 9/30036* (2013.01); *G06F 9/30098* (2013.01)
(58) Field of Classification Search
CPC ............ G06F 9/30021; G06F 9/30036; G06F 9/30098; G06F 9/30018
USPC ...................................................... 712/221
See application file for complete search history.

(56) References Cited

U.S. PATENT DOCUMENTS

| 4,933,662 A * | 6/1990 | Szczepanek | G06F 7/02 340/146.2 |
| 5,592,142 A | 1/1997 | Adams et al. | |
| 5,887,183 A * | 3/1999 | Agarwal | G06F 9/30043 712/17 |
| 6,681,315 B1 * | 1/2004 | Hilts | H04L 12/40013 348/E7.069 |
| 7,352,275 B2 | 4/2008 | Coloma | |

(Continued)

FOREIGN PATENT DOCUMENTS

EP 3091450 A1 9/2016

OTHER PUBLICATIONS

Raman et al., "DB2 with BLU Acceleration: So Much More than Just a Column Store", Proceedings of the VLDB Endowment, vol. 6, No. 11, pp. 1-12.

(Continued)

*Primary Examiner* — Aimee Li
*Assistant Examiner* — Shawn Doman
(74) *Attorney, Agent, or Firm* — Alexis N. Hatzis

(57) ABSTRACT

A method, computer program product, and computer system for providing a comparison result vector of a predefined number of elements w resulting from comparison of multiple vectors of compressed data within a processor comprising registers of same size m is provided. Vector elements of the comparison result vector are stored in a register of the registers. Zero bits are padded between vector elements of each of the comparison result vectors. A compare bit result vector indicative of the vector elements is generated for accessing the results of the comparison in the comparison result vector.

9 Claims, 9 Drawing Sheets

(56) References Cited

U.S. PATENT DOCUMENTS

| | | | |
|---|---|---|---|
| 7,403,407 B1 | 7/2008 | Wanzakhade | |
| 8,065,322 B2 | 11/2011 | Nagoya | |
| 8,843,527 B2 | 9/2014 | Diner et al. | |
| 9,424,308 B2 | 8/2016 | Buyuktosunoglu et al. | |
| 2006/0101258 A1* | 5/2006 | Jones | G06F 9/30018 712/300 |
| 2007/0255933 A1* | 11/2007 | Moyer | G06F 9/30036 712/234 |
| 2010/0124308 A1* | 5/2010 | Chang | H03K 21/38 377/27 |
| 2012/0330931 A1 | 12/2012 | Nakano et al. | |
| 2014/0189296 A1* | 7/2014 | Ould-Ahmed-Vall | G06F 9/30036 712/22 |
| 2015/0186141 A1* | 7/2015 | Plotnikov | G06F 9/30018 712/210 |
| 2016/0188532 A1* | 6/2016 | Ould-Ahmed-Vall | G06F 9/30018 712/5 |
| 2016/0364154 A1 | 12/2016 | Amidi et al. | |
| 2018/0217845 A1* | 8/2018 | Kimura | G06F 8/41 |
| 2019/0155603 A1* | 5/2019 | Villmow | G06F 9/30018 |

OTHER PUBLICATIONS

Mehra, "2-Bit Comparator Using Different Logic Style of Full Adder", International Journal of Soft Computing and Engineering (IJSCE), ISSN: 2231-2307, vol. 3, Issue-2, May 2013, pp. 277-279.

Abdel-Hafeez et al., "Scalable Digital CMOS Comparator Using a Parallel Prefix Tree", IEEE Transactions on Very Large Scale Integration (VLSI) Systems, vol. 21, No. 11, Nov. 2013, pp. 1989-1998.

Kim et al., "FAST: Fast Architecture Sensitive Tree Search on Modern CPUs and GPUs", SIGMOD'10, Jun. 6-11, 2010, pp. 339-350.

Hilewitz et al., "Performing Advanced Bit Manipulations Efficiently in General-Purpose Processors", 18th IEEE Symposium on Computer Arithmetic(ARITH'07), 2007 IEEE, pp. 1-10.

IBM, List of IBM Patents or Patent Applications Treated as Related, Appendix P, dated Oct. 16, 2018, 2 pages.

Pending U.S. Appl. No. 15/889,315, filed Feb. 6, 2018, entitled: "Method to Build Reconfigurable Variable Length Comparators".

\* cited by examiner

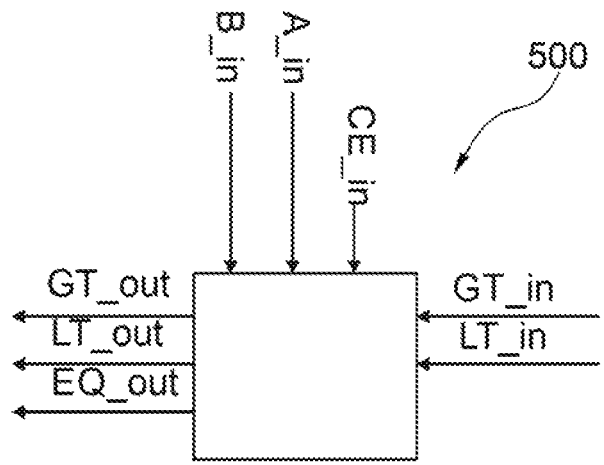

"CE_in, GT_in, LT_in, A_in, B_in" => 'GT_out', 'EQ_out', 'LT_out'

| | | |
|---|---|---|
| 0x00000000000000000000000000000000 | when | n=1, |
| 0x55555555555555555555555555555555 | when | n=2, |
| 0x6DB6DB6DB6DB6DB6DB6DB6DB6DB6DB6D | when | n=3, |
| 0x77777777777777777777777777777777 | when | n=4, |
| 0x7BDEF7BDEF7BDEF7BDEF7BDEF7BDEF7B | when | n=5, |
| 0x7DF7DF7DF7DF7DF7DF7DF7DF7DF7DF7D | when | n=6, |
| 0x7EFDFBF7EFDFBF7EFDFBF7EFDFBF7EFD | when | n=7, |
| 0x7F7F7F7F7F7F7F7F7F7F7F7F7F7F7F7F | when | n=8, |
| 0x7FBFDFEFF7FBFDFEFF7FBFDFEFF7FBFD | when | n=9, |
| 0x7FDFF7FDFF7FDFF7FDFF7FDFF7FDFF7F | when | n=10, |
| 0x7FEFFDFFBFF7FEFFDFFBFF7FEFFDFFBF | when | n=11, |
| 0x7FF7FF7FF7FF7FF7FF7FF7FF7FF7FF7F | when | n=12, |
| 0x7FFBFDFFEFFF7FFBFDFFEFFF7FFBFF | when | n=13, |
| 0x7FFDFFF7FFDFFF7FFDFFF7FFDFFF7FFD | when | n=14, |
| 0x7FFEFFFDFFFBFFF7FFEFFFDFFFBFFF7F | when | n=15, |
| 0x7FFF7FFF7FFF7FFF7FFF7FFF7FFF7FFF | when | n=16, |
| 0x7FFFBFFFDFFFEFFFF7FFFBFFFDFFFEFF | when | n=17, |
| 0x7FFFDFFFF7FFFDFFFF7FFFDFFFF7FFFD | when | n=18, |
| 0x7FFFEFFFFDFFFFBFFFF7FFFEFFFFDFFF | when | n=19, |
| 0x7FFFF7FFFF7FFFF7FFFF7FFFF7FFFF7F | when | n=20, |
| 0x7FFFFBFFFFDFFFFEFFFFF7FFFFBFFFFD | when | n=21, |
| 0x7FFFFDFFFFF7FFFFDFFFFF7FFFFDFFFF | when | n=22, |
| 0x7FFFFEFFFFFDFFFFFBFFFFF7FFFFEFFF | when | n=23, |
| 0x7FFFFF7FFFFF7FFFFF7FFFFF7FFFFF7F | when | n=24, |
| 0x7FFFFFBFFFFFDFFFFFEFFFFFF7FFFFFB | when | n=25, |
| 0x7FFFFFDFFFFFF7FFFFFDFFFFFF7FFFFF | when | n=26, |
| 0x7FFFFFEFFFFFFDFFFFFFBFFFFFF7FFFF | when | n=27, |
| 0x7FFFFFF7FFFFFF7FFFFFF7FFFFFF7FFF | when | n=28, |
| 0x7FFFFFF7FFFFFF7FFFFFF7FFFFFF7FFF | when | n=29, |
| 0x7FFFFFFDFFFFFFF7FFFFFFDFFFFFFF7F | when | n=30, |
| 0x7FFFFFFEFFFFFFFDFFFFFFFBFFFFFFF7 | when | n=31, |
| 0x7FFFFFFF7FFFFFFF7FFFFFFF7FFFFFFF | when | n=32, |

```
0x7FFFFFFFBFFFFFFFDFFFFFFFEFFFFFFF      when    n=33,
0x7FFFFFFFDFFFFFFF7FFFFFFFDFFFFFF       when    n=34,
0x7FFFFFFFEFFFFFFFDFFFFFFFFBFFFFF       when    n=35,
0x7FFFFFFFF7FFFFFFF7FFFFFFFF7FFFF       when    n=36,
0x7FFFFFFFFBFFFFFFFDFFFFFFFFEFFFF       when    n=37,
0x7FFFFFFFFDFFFFFFFF7FFFFFFFFDFFF       when    n=38,
0x7FFFFFFFFEFFFFFFFFDFFFFFFFFFBFF       when    n=39,
0x7FFFFFFFFF7FFFFFFFF7FFFFFFFFF7F       when    n=40,
0x7FFFFFFFFFBFFFFFFFFDFFFFFFFFFEF       when    n=41,
0x7FFFFFFFFFDFFFFFFFFF7FFFFFFFFFD       when    n=42,
0x7FFFFFFFFFEFFFFFFFFFDFFFFFFFFFF       when    n=43,
0x7FFFFFFFFFF7FFFFFFFFF7FFFFFFFFFF      when    n=44,
0x7FFFFFFFFFFBFFFFFFFFFDFFFFFFFFFF      when    n=45,
0x7FFFFFFFFFFDFFFFFFFFFF7FFFFFFFFFF     when    n=46,
0x7FFFFFFFFFFEFFFFFFFFFFDFFFFFFFFFF     when    n=47,
0x7FFFFFFFFFFF7FFFFFFFFFF7FFFFFFF       when    n=48,
0x7FFFFFFFFFFFBFFFFFFFFFFFDFFFFFFF      when    n=49,
0x7FFFFFFFFFFFDFFFFFFFFFFF7FFFFFFF      when    n=50,
0x7FFFFFFFFFFFEFFFFFFFFFFFFDFFFFFFF     when    n=51,
0x7FFFFFFFFFFFF7FFFFFFFFFFF7FFFFF       when    n=52,
0x7FFFFFFFFFFFFBFFFFFFFFFFFDFFFFF       when    n=53,
0x7FFFFFFFFFFFFDFFFFFFFFFFFF7FFFFF      when    n=54,
0x7FFFFFFFFFFFFEFFFFFFFFFFFFDFFFFF      when    n=55,
0x7FFFFFFFFFFFFF7FFFFFFFFFFFFF7FFF      when    n=56,
0x7FFFFFFFFFFFFFBFFFFFFFFFFFFFDFFF      when    n=57,
0x7FFFFFFFFFFFFFDFFFFFFFFFFFFFF7FF      when    n=58,
0x7FFFFFFFFFFFFFEFFFFFFFFFFFFFFDFF      when    n=59,
0x7FFFFFFFFFFFFFF7FFFFFFFFFFFFFF7F      when    n=60,
0x7FFFFFFFFFFFFFFBFFFFFFFFFFFFFFDF      when    n=61,
0x7FFFFFFFFFFFFFFDFFFFFFFFFFFFFFF7      when    n=62,
0x7FFFFFFFFFFFFFFEFFFFFFFFFFFFFFFD      when    n=63,
0x7FFFFFFFFFFFFFFF7FFFFFFFFFFFFFFF      when    n=64
```

*FIG. 7B*

ALIGNING MOST SIGNIFICANT BITS OF DIFFERENT SIZED ELEMENTS IN COMPARISON RESULT VECTORS

BACKGROUND

The present invention relates to the field of digital computer systems, and more specifically, to a method, computer program product, and computer system to compare multiple vectors of compressed binary data within a processor.

One central component of a database is its search engine used to process queries. Especially the inner loop is comparing a search value against all entries of a column and checking for equal or within a range. Modern databases are storing their data in a compressed format. Due to the general data distribution, the data saved in a column will have different lengths based on the compression dictionary. Compressed data is saved in long words to maximize space/load/store utilization, with every compressed data element having the same size within this long word/or database page area. However, the search of such data requires a large and complex hardware structure.

SUMMARY

Various embodiments provide a method to compare multiple vectors of compressed binary data within a processor, system and computer program product as described. Advantageous embodiments are described in the dependent claims. Embodiments of the present invention can be freely combined with each other if they are not mutually exclusive.

In one aspect, the invention relates to a method to provide a comparison result vector of a predefined number of elements w resulting from a comparison of multiple vectors of compressed data within a processor comprising registers of equal size m. The method comprises: storing the vector elements of the comparison result vector in a register of the registers, wherein zero bits are padded between vector elements of the comparison result vector; generating a compare bit result vector indicative of the vector elements for accessing the results of the comparison in the comparison result vector.

In another aspect, the invention relates to a computer program product comprising a computer-readable storage medium having computer-readable program code embodied therewith, the computer-readable program code configured to implement all of steps of the method according to preceding embodiments.

In another aspect, the invention relates to a computer system to provide (e.g. in order to access) a comparison result vector of a predefined number of elements w resulting from a comparison of multiple vectors of compressed data within a processor comprising registers of equal size m. The computer system is configured for: storing the vector elements of the comparison result vector in a register of the registers, wherein zero bits are padded between vector elements of the comparison result vector; generating a compare bit result vector indicative of the vector elements for accessing the results of the comparison in the comparison result vector.

BRIEF DESCRIPTION OF THE SEVERAL VIEWS OF THE DRAWINGS

In the following embodiments the invention are explained in greater detail, by way of example only, making reference to the drawings in which:

FIG. 5 depicts a one-bit compare block in accordance with the present disclosure.

FIG. 7A is a table of example values of cascade enable input vector.

FIG. 7B is a table of example values of cascade enable input vector.

DETAILED DESCRIPTION

Figure 1:
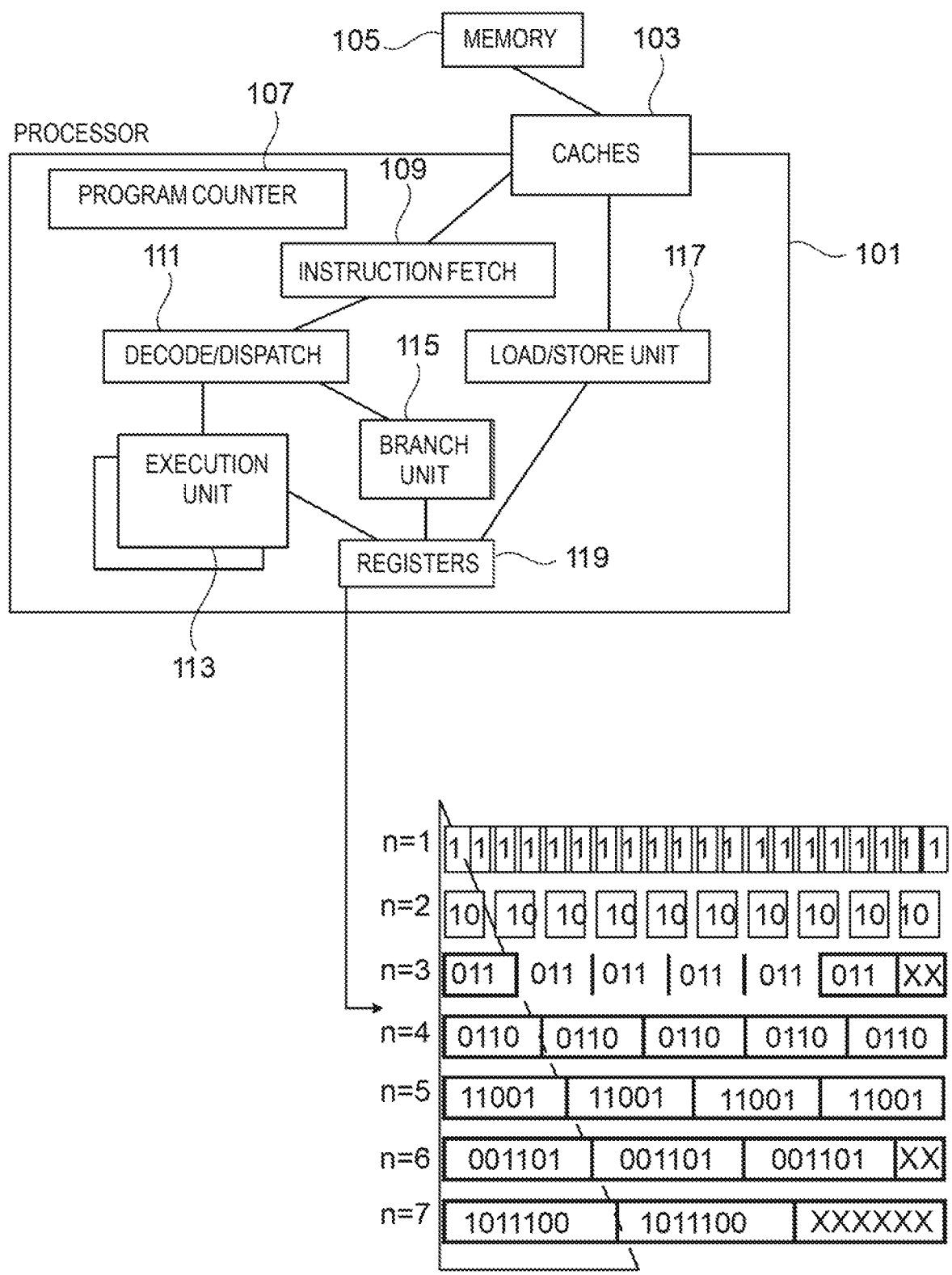
FIG. 1 is an exemplary structure of a processor in accordance with the present disclosure.

The descriptions of the various embodiments of the present invention will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand.

Each register has a fixed length of m bits that may hold a single vector. The vector may comprise vector elements having respective size n (i.e. each vector element has or occupies n bits). Each register comprises vector elements of same size n. Based on size n, a register may have a width of 1 to m. The width of a register refers to the number of vector elements in the register.

The present method may comprise rearranging the vector elements within compressed blocks by adding padding bits between the vector elements such that for all elements width resulting in the same number of elements per compressed block, the most significant bit position is aligned. By adding the padding bits between the elements, the handling of variable length search has far less different length dependent cases to handle reducing the effort (e.g. in software). Similarly the hardware implementation remove a significant portion of the multiplexing logic that may be necessary to compute the final compare result. This may reduce the size of the hardware and improve the cycle time. Beside the area saved, the present method may also remove large multiplexer logic on the critical path resulting in additional power/cycle time savings.

According to one embodiment, the compare bit result vector comprises values indicative of each vector element of the comparison result vector. For example, the most significant bit of a vector element of the comparison result vector may be indicative of the comparison result between a vector element and a search value. The search value may also be encoded and stored as a vector element.

According to one embodiment, a vector element of the comparison result vector comprises bits indicative of the result of comparison between two vector elements of the multiple vectors, wherein a given bit of the vector element is indicative of the result of comparison of the two vector elements.

According to one embodiment, the compare bit result vector comprises w bits each indicative of the given bit.

According to one embodiment, the given bit being the most significant bit.

According to one embodiment, the vector elements have a size of n bits each, providing another comparison result vectors having the same number of elements w, and each element of each other comparison result vector has a respective different size of n' bits, wherein the padding is performed such that that the most significant bit of each element of the comparison result vector is aligned with the corresponding element in the other comparison result vectors.

According to one embodiment, a vector element of the comparison result vector comprises bits indicative of the result of comparison between two vector elements of the multiple vectors, the method further comprising: processing a vector element of the comparison result vector by selecting the given bit of the vector element using the bit result vector, wherein the given bit is indicative of the result of the comparison of the two vector elements. This may enable a very efficient method for comparing vectors.

According to one embodiment, vector elements are stored in a register in an order following the bit positions in the register, the method further comprises assigning a multiplexer to a given order of elements in the register, the multiplexer having n inputs, the n inputs being bits of a vector element of the comparison result vector, one or more control inputs, and a single output being the most significant bit of the vector element, wherein a control input of the control inputs comprises the width w of the comparison result vector.

This embodiment may provide a simplified hardware structure as a single multiplexer is required for a whole set of comparison vectors.

The predefined number of elements per vector for which an alignment may be performed is smaller than 10 for m=128.

FIG. 1 is an exemplary structure of a processor 101. For example, one or more levels of cache 103 are employed to buffer memory data in order to improve processor performance. The cache 103 is a high speed buffer holding cache lines of memory data that are likely to be used. Typical cache lines are 64, 128 or 256 bytes of memory data. Cache 103 is caching data of higher hierarchical storage being main memory storage 105.

A program counter (instruction counter) 107 keeps track of the address of the current instruction to be executed. A program counter in a z/Architecture processor is 64 bits and can be truncated to 31 or 24 bits to support prior addressing limits. A program counter may typically be embodied in a PSW (program status word) of a computer such that it persists during context switching. Thus, a program in progress, having a program counter value, may be interrupted by, for example, the operating system (context switch from the program environment to the operating system environment). The PSW of the program maintains the program counter value while the program is not active, and the program counter (in the PSW) of the operating system is used while the operating system is executing. Typically, the program counter is incremented by an amount equal to the number of bytes of the current instruction. RISC (Reduced Instruction Set Computing) instructions are typically fixed length while CISC (Complex Instruction Set Computing) instructions are typically variable length. Instructions of the IBM z/Architecture may be CISC instructions having a length of 2, 4 or 6 bytes. The Program counter 107 is modified by either a context switch operation or a branch taken operation of a branch instruction for example. In a context switch operation, the current program counter value is saved in the program status word along with other state information about the program being executed (such as condition codes), and a new program counter value is loaded pointing to an instruction of a new program module to be executed. A branch taken operation is performed in order to permit the program to make decisions or loop within the program by loading the result of the branch instruction into the program counter 107.

Typically an instruction fetch unit 109 is employed to fetch instructions on behalf of the processor 101. The fetch unit 109 either fetches "next sequential instructions", target instructions of branch taken instructions, or first instructions of a program following a context switch. Examples of Instruction fetch units often employ prefetch techniques to speculatively prefetch instructions based on the likelihood that the prefetched instructions might be used. For example, a fetch unit may fetch 16 bytes of instruction that includes the next sequential instruction and additional bytes of further sequential instructions.

The fetched instructions are then executed by the processor 101. For example, the fetched instruction(s) are passed to a dispatch unit 111 of the fetch unit. The dispatch unit 111 decodes the instruction(s) and forwards information about the decoded instruction(s) to appropriate units 113, 115, 117. An execution unit 113 may typically receive information about decoded arithmetic instructions from the instruction fetch unit 109 and may perform arithmetic operations on operands according to the opcode of the instruction. Operands are provided to the execution unit 113 preferably either from memory 105, architected registers 119 or from an immediate field of the instruction being executed. Results of the execution, when stored, are stored either in memory 105, registers 119 or in other machine hardware (such as control registers, PSW registers and the like).

As shown in FIG. 1, registers 119 may have a same size m. For example, each of the registers 119 may store m bits. In the example of FIG. 1, m=20. Each register of the registers may store a vector of bits, wherein the vector comprises element vectors of respective size n. FIG. 1 shows that registers 119 may for example store an input vector for variable element length n between 1 and 7.

In order to obtain the m bits, each register may be completed by garbage bits depending on the vector element's length m. For example, in case n=7, the register may comprise only two vector elements (of 14 bits) and remaining 6 bits are not sufficient to store a vector element of size 7 and thus may be used as garbage bits. The number of vector elements per register may be referred to as the width w of the register or of the vector stored in the register.

The data stored in the register 119 may for example be processed or formatted in accordance with IBM BLU Acceleration technology for analytic queries. For example, the data may be compressed data e.g. based on an approximate Huffman encoding. Such compressed data may not be decoded (or uncompressed) when processing SQL predicates (that is, =, <, >, >=, <=, BETWEEN etc.), joins, aggregations, and more. The data may be searched directly as decompressing the data first is a lengthy and costly operation.

The data stored in the registers 119 may for example be processed using a parallel vector processing technique e.g. using Single Instruction Multiple Data (SIMD) hardware.

Figure 2:
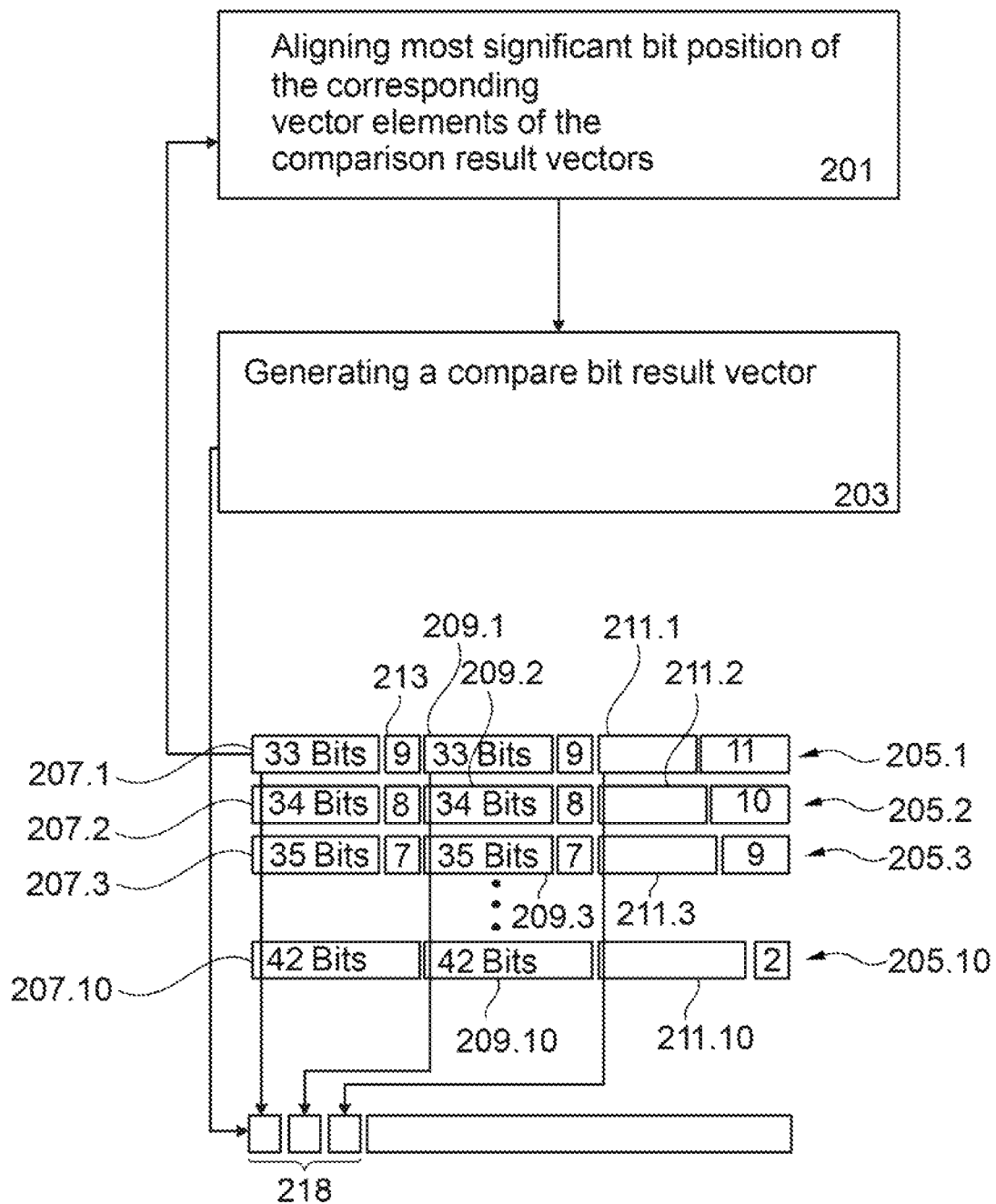
FIG. 2 is a flowchart of a method for comparing multiple vectors of compressed binary data within a processor.

FIG. 2 is a flowchart of a method for comparing multiple vectors of compressed binary data within a processor e.g. 101.

For exemplification purpose, FIG. 2 depicts example comparison result vectors 205.1-10 having the same number of vector elements (or same width) i.e. w=3 vector elements for registers of 128 bits. For example, vector 205.1 comprises three vector elements 207.1, 209.1 and 211.1 each having 33 bits. The comparison result vectors 205 may for example be obtained using (or may be the output) the comparators described with reference to FIGS. 5-7. The comparison result vectors 205 may be the result of comparison of multiple vectors.

In step 201, the most significant bit position of the corresponding vector elements of the comparison result vectors are aligned. This may for example be performed by padding zero bits 213 between vector elements of each of the comparison result vectors. For example, between vector elements 207.1 and 209.1, 9 padding bits are added, between vector elements 207.2 and 209.2, 8 padding bits are added, and between vector element 207.3 and 209.3, 7 padding bits are added. Between vector elements 209.1 and 211.1, 9 padding bits are added etc.

In the example of FIG. 2, the corresponding vector elements are vector elements 207.1-207.10 for which the most significant bit corresponds to the most significant bit of the respective register (or respective vector). Vector elements 209.1-209.10 are corresponding vector elements. Vector elements 211.1-211.10 are corresponding vector elements.

In step 203, a compare bit result vector 218 having the size w (e.g. w=3) may be generated for accessing the results of the comparison in the set of comparing result vectors 205.1-205.10. The compare bit result vector comprises values indicative of each vector element of the comparison result vector e.g. 205.1.

For example, steps 201-203 may be performed at once in response to one of the vectors 205.1-205.10 being first registered. For example, in case the result vector 205.1 is first registered, steps 201 and 203 may be performed and for the following vectors 205.2-205.10 only step 201 may be performed. FIG. 2 shows multiple vector elements for exemplification purpose. The present method may be applied vector by vector. For example, as an instruction (e.g. of the method) is executed with a defined vector element width (n), there may be only one result vector (for that particular width n) at a time. The instruction can be reexecuted with arbitrary width, so that depending on the vector element width passed to the instruction, different result element layouts in the result vector may exist. The present method comprises aligning the elements within the vector such that the number of different MSB position for the elements in the vector is minimized over all element widths for a given number of elements w per register or vector.

Figure 3:
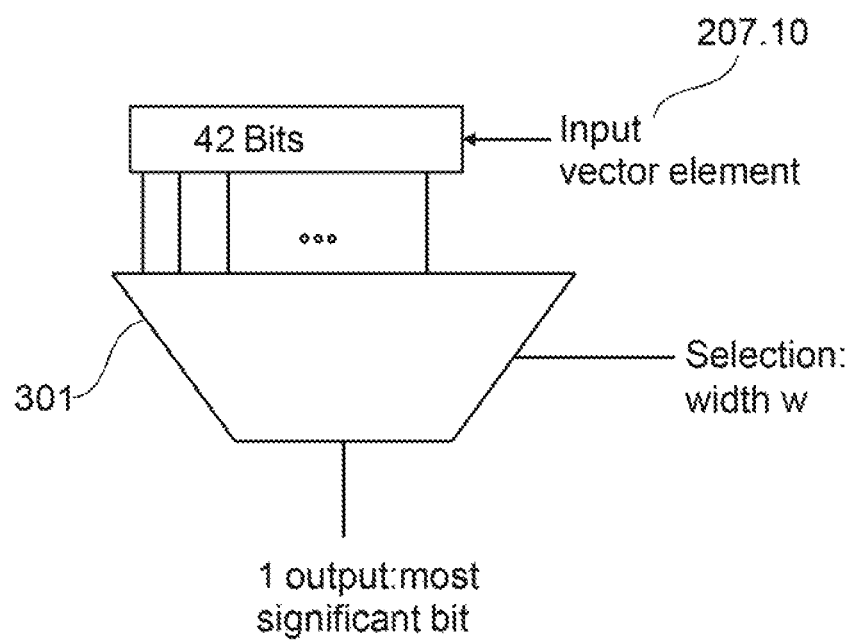
FIG. 3 depicts a multiplexer for selecting the comparison results in accordance with the present disclosure.

FIG. 3 depicts a multiplexer 301 for selecting the comparison results in accordance with the present disclosure. For example, the multiplexer 301 may be configured to receive as inputs a vector element of the vector elements 207.1-211.10.

For example, FIG. 3 shows the multiplexer 301 receiving as input the vector element 207.10. Among the 42 bits of the vector element 207.10, the multiplexer may select one bit which is the most significant bit of that vector element. For the selection, the multiplexer 301 uses a control input for selection. The control input comprises the width of the vector that comprises the input vector element. The multiplexer 301 may comprise a map that maps each width to a respective position of the most significant bit. This table may be created using the compare bit result vectors 218.

Figure 4:
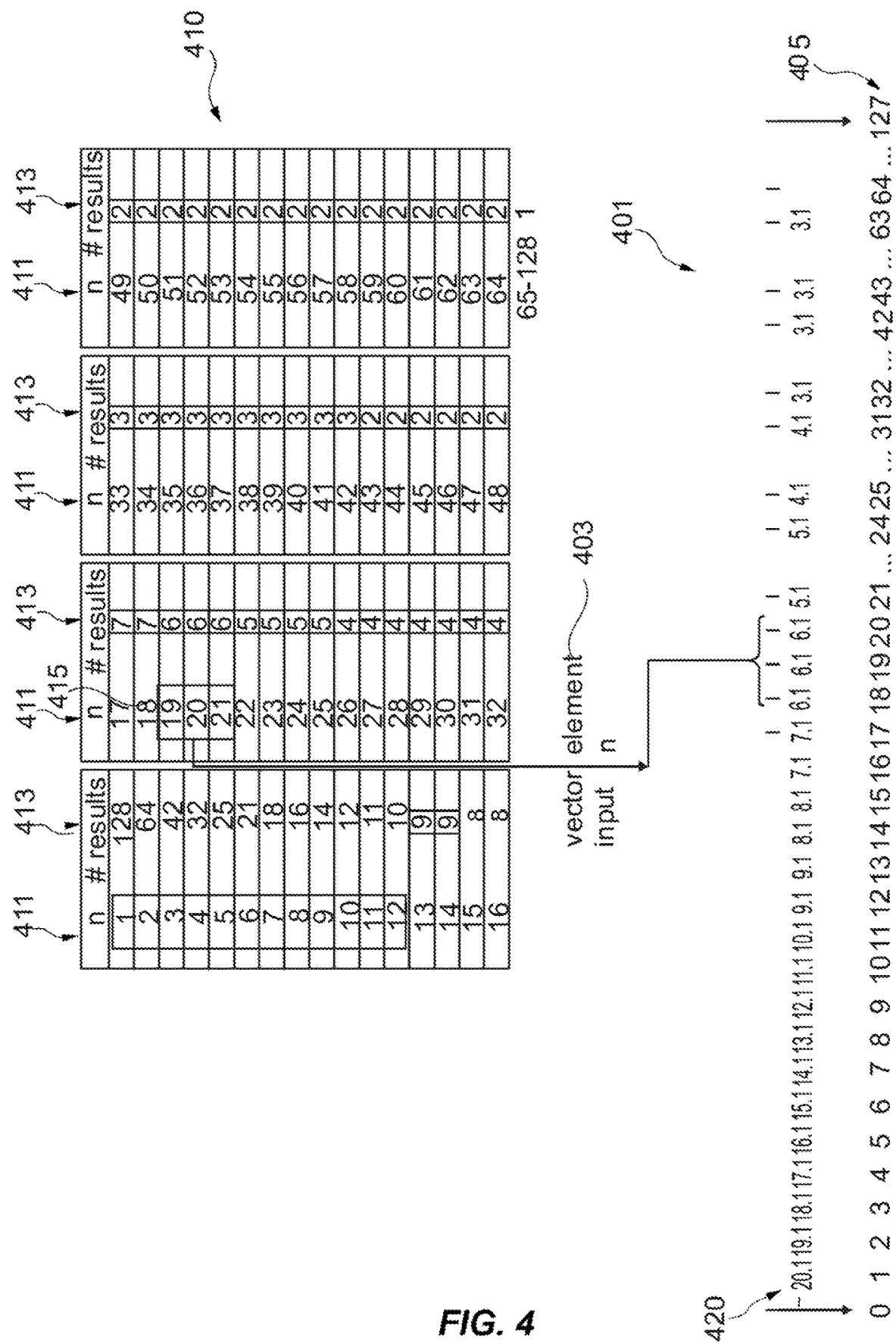
FIG. 4 depicts an apparatus for selecting the comparison results for vectors of different widths.

FIG. 4 depicts an apparatus for selecting the comparison results for vectors of different widths (i.e. different number of vector elements). For example, for registers having 128 bits as shown in FIG. 4, there may be 128 different widths. The apparatus comprises a multiplexer system 401. This is illustrated in table 410, where a first column 411 represents attribute "n" which is the size or length of a vector element that can be stored in register. A second column 413 representing attribute "# results" (or width w) indicates the width of (or number of vector elements in) the register. For each value of n a corresponding width is associated with in the table 410. And different values of n may be associated with the same width. For example, the group 415 of values of n, 19 to 21 are associated with the same width=6. The elements are stored in a register in a given order. For example vector element 207.1 may be referred to as the first element of vector or register 205.1 (having first order). Vector element 209.1 may be referred to as the second element of vector or register 205.1 (having second order). Vector element 211.1 may be referred to as the third element of vector or register 205.1 (having third order) and so on. For a register of 128 bits, 128th order may be the maximum order that can exist.

Each $i^{th}$ order is associated with a bit in a register 405. For example, bit 0 of register 405 is associated with first order elements, bit 1 with second order elements etc. The multiplexer system 401 may receive as input a vector element (i.e., vector element 403). The input vector element may be of a given order. Based on the order of the input vector element a respective multiplexer of the multiplexers 420 is used to select the most significant bit of the input vector element. For example the multiplexer "20:1" may have the following meaning or function: for registers or vectors of size 128 bits, there are 20 possible widths (i.e. number of elements per vector) higher or equal to 2.

Since the present method aligns the vector elements of vectors having same width (and different element size), a single bit position may be used for those vectors.

Thus, for an input which is a second vector element (second order) there are 20 possible values of the most significant bit. In order to select one value among the 20 possible values the multiplexer 20:1 may be used to select a value based on the width of the vector that comprises the input vector element.

The selected most significant bit is stored in the bit of the register 405 that corresponds to the order of the input vector element.

For input vector elements of the first order (e.g. 207.1) the most significant is the same (e.g. bit 0). Thus the selection using a multiplexer may not be required as indicated in FIG. 4 with a direct arrow to the corresponding output bit in the register. Also, since there is only a single width (w=128) for which vector elements may have an order higher than 65 there may be no need to do a selection using a multiplexer as indicated for bits 64-127 of register 405.

At a first stage the multiplexer system may select based on the order of the input vector element one of the multiplexers 420. At a second stage the most significant bit nay be selected by the selected multiplexer using the width of the input vector element.

Thus, the present apparatus for the invention consists of a multiplexing scheme matching the element alignment and collecting the most significant bit of each vector element. To support 128 different element sizes with proper elements alignment only a 20-way multiplexer may be required.

FIG. 5 depicts a one-bit compare block 500 in accordance with the present disclosure. The one-bit compare block 500 has as inputs one bit from two vectors to be compared, namely input bit A_in for one vector and input bit B_in for the other vector. The one-bit compare block 500 further has a cascade enable bit (CE_in) that controls if the greater-than and less-than results (GT_in and LT_in) of a previous one-bit compare block should be taken into account. The outputs of the one-bit compare block 500 are an equal EQ_out, greater than GT_out and less than signals LT_out that represent the compare results of the n previous one-bit compare blocks with CE_M=1.

The outputs EQ_out, GT_out and LT_out are generated based on the truth table 510. The truth table 510 as shown in FIG. 5 comprises an example mapping between the group of values (CE_in, GT_in, LT_in, A_in and B_in) and the corresponding output group (EQ_out, GT_out and LT_out).

The outputs EQ_out, GT_out and LT_out may be obtained by the following Boolean operations involving bitwise operations:

GT_out=(A_in >B_in) OR ((A_in ==B_in) AND (GT_in AND CE_in)).

LT_out=(A_in <B_in) OR ((A_in ==B_in) AND (LT_in AND CE_in)).

EQ_out=(EQ_in AND CE_in) AND (A_in ==B_in), where EQ_in =(GT_in=0) AND (LT_in=0).

Please note that with regard to FIG. 5, the inputs 11100, 11101, 11110, and 11111 are illegal, and any and all output combinations generated are contemplated within the scope of the invention. Outputs '0'; '0'; '0' are displayed for the sake of simplicity.

Figure 6A:
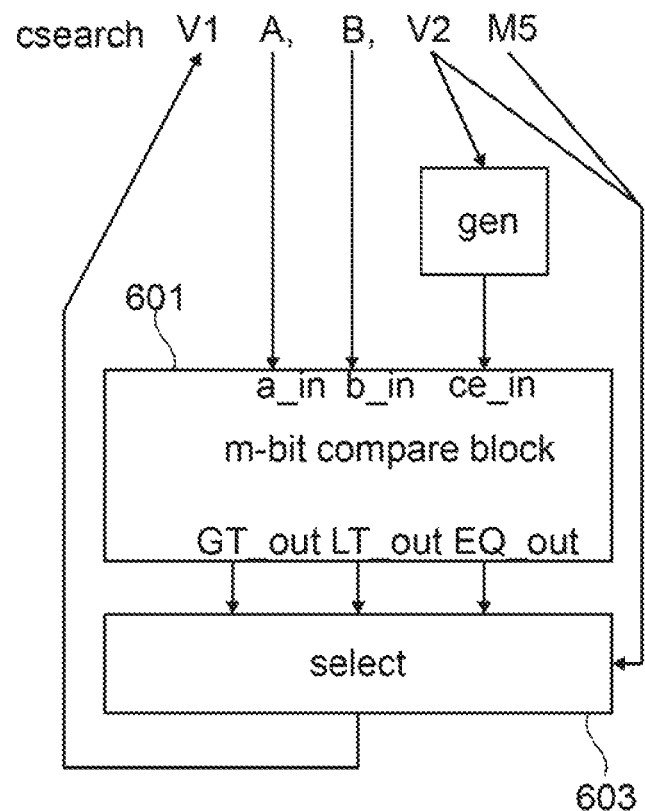
FIG. 6A illustrates the instructions and corresponding hardware blocks for comparing multiple vectors.
Figure 6B:
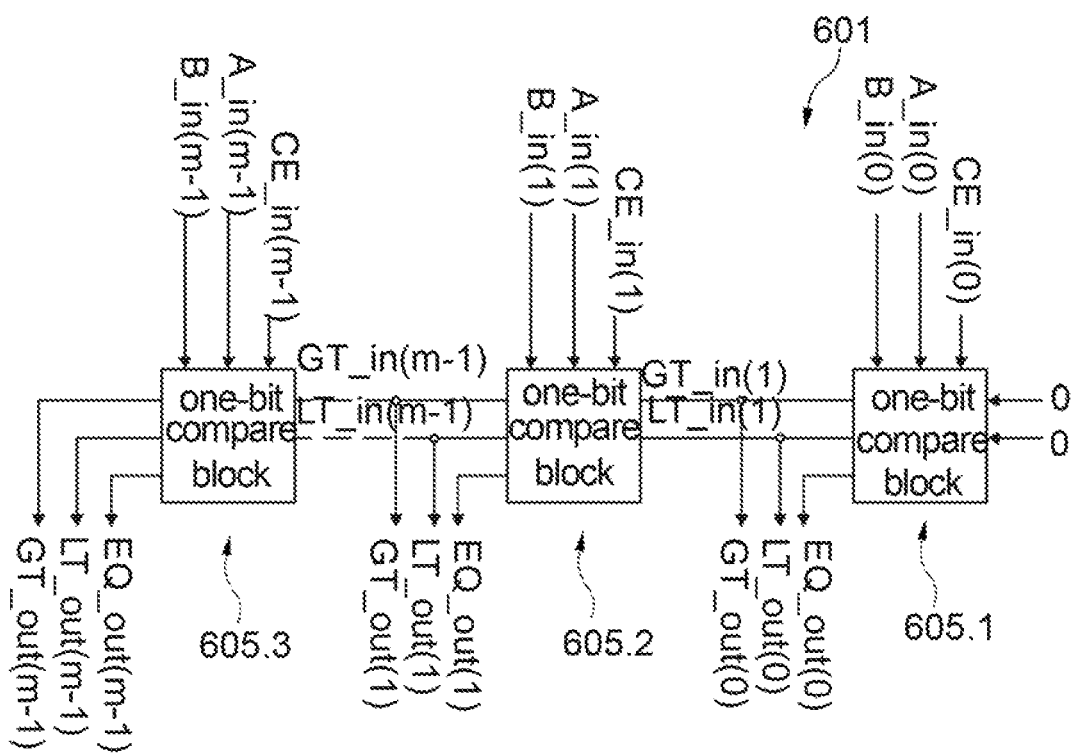
FIG. 6B illustrates a daisy chaining example of one bit compare blocks.

FIG. 6A illustrates the instruction and corresponding hardware blocks for comparing multiple vectors.

For example, an instruction for performing searches in accordance with the present disclosure may be defined as follows: csearch V1, A, B, V2, M5. V1 is the result vector that contains the results of comparing the vectors A and B. A and B are stored in respective registers. V2 contains the length of the vector elements in the vectors A and B. M5 encodes compare type (=, <, >, <=, =>) as well as the value of V2. The comparison result is saved in V1.

The vectors A, B and V2 are input to a compare block 601. And the outputs of the compare block 601 are selected using a selector (e.g. multiplexer) 603. The selection is based on the type of comparison being performed and the length of the vector elements as encoded in M5. For example, if the comparison involves an equal operator only EQ_out bits obtained from each of the compare blocks are stored in V1. V1 may be stored in a register 119 as described with reference to FIG. 1.

In order to support the variable length comparison, the CE_in vector needs to be zero at the boundary between two vector elements inside the vector B, else one. The CE_in may for example be set using V2. The table 701 of FIGS. 7A and 7B shows example values for the CE_in vector for 128 bit registers and vector elements of the size or length of 1 to 64. The CE_in may be predefined or selected based on the length value in V2, or may be passed as a register vector V2 containing the bit values for the CE_ins as shown in FIGS. 7A and 7B.

For example, the registers of the processor 101 may comprise m bits each. The input vector B may have elements having m bits to be compared against bits of the other input vector A. The input vector A may for example be a searched query value. For such a comparison, the compare block 601 may comprise m one-bit compare blocks 605.1-605.m which are daisy chained as illustrated in FIG. 3. The most significant bit of each element of the output vectors GT_out, LT_out and EQ_out represent the result of the comparison (greater, less, equal) for that element of the vector. Assuming for example that B has w=3 vector elements (B1, B2 and B3) of size n each. The searched value may be encoded on a vector element of size n. vector A comprises a vector element having the size n that is replicated w times to match the number of vector elements of B. A comprises vector elements A1, A2 and A3 each comprising the searched value and have positions corresponding to positions of the B1-B3 respectively. The m-one bit compare blocks may be used to compare A1 with B1, A2 with B2 and A3 with B3. The CE_in enables to switch between different comparisons. For example, the first time CE_in=0 is read the comparison starts between A1 and B1, and once a CE_in=0 again this indicates that a new comparison is to be started between A2 and B2 and so on.

For example, the comparison may involve an equal operator. Assuming for exemplification purpose that the vectors have vector elements of size 3 (n=3) which may for example also be the size of the register m=3. For example a vector having a vector element B="011" may be stored in the processor 101 and the comparison is triggered by a query requiring the database entries which match "3". For example, value 3 may be encoded on 3 bits as A="011". The comparison may involve comparing A and B. B_1(or B(1)) =0, B_2 (or B(2)=1, B_3(or B(3))=1.

Since the vectors A and B have size of three bits (m=3), three of the one bit compare blocks may be connected or daisy chained per group to compute the result of comparing A and B. Only an equal is obtained as a result, when all three bits of A match B ('011').

For that, a first comparison is performed between the least significant bit A_3 against B_3 by the first one bit compare block 605.1. For this first one bit compare block 605.1, the CE_in =0, and thus the GT_in/LT_in information is ignored when comparing A_3 with B_3. The GT_in and LT_in for the first bit compare block 605.1 may be set to 0. In the comparison, "0" is considered less than "1". The output of the first one bit compare block 605.1 is GT_out, LT_out and EQ_out, where the GT_out and LT_out are inputs to a second one bit compare block 605.2 as GT_in and LT_in respectively.

The outputs may be obtained by the following Boolean operations involving bitwise operations:

GT_out=(A_in >B_in) OR ((A_in ==B_in) AND (GT_in AND CE_in)).

LT_out=(A_in <B_in) OR ((A_in ==B_in) AND (LT_in AND CE_in)).

EQ_out=(EQ_in AND CE_in) AND (A_in ==B_in), where EQ_in =(GT_in=0) AND (LT_in=0).

Since A_3=B_3, EQ_out=1, GT_out=0 and LT_out=0 for the first one bit compare block 605.1.

Then, a second comparison is performed between A_2 and B_2 using the second one bit compare block 605.2 which is connected to the first one bit compare block 605.2. For this second one bit compare block 605.2 the CE_in=1. This indicates that the GT_in/LT_in obtained from the first bit compare block 605.1 may be taken into account.

Since A_2=B_2 and GT_in=LT_in=0, EQ_out=1, GT_out=0 and LT_out=0 for the second one bit compare block 605.2.

Then a third comparison is performed between A_1 and B_1 using a third one bit compare block 60.5.3 (m=3) which is connected to the second one bit compare block 605.2. For this third one bit compare block 605.3 the CE_M=1. This indicates that the GT_in/LT_in obtained from the second bit compare block 605.2 may be taken into account. An equal is obtained since A1=B1 and GT_in=0 and LT_in =0.

In another example, the comparison involves a greater than comparison A>B which mathematically means that A(1,2,3)>B(1,2,3). This can be obtained by A(1)>B(1) or A(1)=B(1) and (A(2,3)>B(2,3)), where A(2,3)>B(2,3) can recursively be computed as A(2)>B(2) or A(2)=B(2) and (A(3)>B(3)). This gives the equation GT_out=(A_in >B_in) OR ((A_in ==B_in) AND (GT_in AND CE_in)) used by each of the compare blocks 605.1-605.m. Similarly with the comparison involving a less than comparison A<B, the equation LT_out=(A_in <B_in) OR ((A_in ==B_in) AND (LT_in AND CE_in)) can be used by each of the compare blocks 605.1-605.m.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method to provide a comparison result vector of a predefined number of vector elements w resulting from a comparison of multiple vectors of compressed data within a processor having registers of equal size m, wherein the vector elements have a size of n bits each, the method comprising:
providing other comparison result vectors having the same number of elements w, wherein elements of each other comparison result vector have a respective different size of n' bits each, wherein a padding is performed such that the most significant bit of each element of the comparison result vector is aligned with the most significant bit of the other comparison result vectors;
storing the vector elements of the comparison result vector in a register of the registers, wherein zero bits are padded between the vector elements of the comparison result vector; and
generating a compare bit result vector indicative of the vector elements for accessing one or more results of the comparison in the comparison result vector.

2. The method of claim 1, wherein the compare bit result vector comprises values indicative of each vector element of the comparison result vector.

3. The method of claim 2, wherein a vector element of the comparison result vector comprises bits indicative of a result of comparison between two vector elements of the multiple vectors, wherein a given bit of a vector element is indicative of the result of comparison of the two vector elements.

4. The method of claim 3, wherein the compare bit result vector comprises w bits each indicative of the given bit of the vector element.

5. The method of claim 3, the given bit being a most significant bit.

6. The method of claim 3, wherein a vector element of the comparison result vector comprises bits indicative of the result of comparison between the two vector elements of the multiple vectors, the method further comprising: processing the vector element of the comparison result vector by selecting the given bit of the vector element of the comparison result vector using the compare bit result vector, wherein the given bit of the vector element of the comparison result vector is indicative of the result of the comparison between the two vector elements.

7. The method of claim 1, wherein vector elements are stored in the register of the registers in an order following a bit position in the register, the method further comprising assigning a multiplexer to a given order of elements in the register, the multiplexer having n inputs, the n inputs being bits of a vector element of the comparison result vector, one or more control inputs, and a single output being the most significant bit of the vector element of the comparison result vector, wherein a control input of the control inputs comprises the width of the comparison result vector.

8. A computer program product using a computing device having registers of equal size m to provide a comparison result vector of a predefined number of vector elements w resulting from comparison of multiple vectors of compressed data, wherein the vector elements have a size of n bits each, the computer program product comprising:
one or more non-transitory computer-readable storage media and program instructions stored on the one or more non-transitory computer-readable storage media, the program instructions, when executed by the computing device, cause the computing device to perform a method comprising:
providing other comparison result vectors having the same number of elements w, wherein elements of each other comparison result vector have a respective different size of n' bits each, wherein a padding is performed such that the most significant bit of each element of the comparison result vector is aligned with the most significant bit of the other comparison result vectors;
storing the vector elements of the comparison result vector in a register of the registers, wherein zero bits are padded between the vector elements of the comparison result vector; and
generating a compare bit result vector indicative of the vector elements for accessing one or more results of the comparison in the comparison result vector.

9. A computer system having registers of equal size m to provide a comparison result vector of a predefined number of vector elements w resulting from comparison of multiple vectors of compressed data, wherein the vector elements have a size of n bits each, the computer system comprising:
one or more computer processors;
one or more computer-readable storage media;
program instructions stored on the computer-readable storage media for execution by at least one of the one or more computer processors, the program instructions comprising:
program instructions to provide other comparison result vectors having the same number of elements w, wherein elements of each other comparison result vector have a respective different size of n' bits each, wherein a padding is performed such that the most significant bit of each element of the comparison result vector is aligned with the most significant bit of the other comparison result vectors;
program instructions to store the vector elements of the comparison result vector in a register of the registers, wherein zero bits are padded between the vector elements of the comparison result vector; and
program instructions to generate a compare bit result vector indicative of the vector elements for accessing one or more results of the comparison in the comparison result vector.

* * * * *